Dec. 30, 1969 W. J. BARTIK 3,487,379

MAGNETIC FREQUENCY MEMORY

Filed July 28, 1964 3 Sheets-Sheet 1

INVENTOR
WILLIAM J. BARTIK

BY Fred Fisher

ATTORNEY

Dec. 30, 1969 W. J. BARTIK 3,487,379

MAGNETIC FREQUENCY MEMORY

Filed July 28, 1964 3 Sheets-Sheet 2

| | ONE STORED | ZERO STORED |
|---|---|---|
| +DC FIELD ALONE | NONE | NONE |
| AC FIELD ALONE | f & 2f | f & 2f |
| +DC & AC FIELDS | f & 2f | NO f, ONLY 2f |
| −DC FIELD ALONE | NONE | NONE |
| AC FIELD ALONE | f & 2f | f & 2f |
| −DC & AC FIELDS | NO f, ONLY 2f | f & 2f |

United States Patent Office 3,487,379
Patented Dec. 30, 1969

3,487,379
MAGNETIC FREQUENCY MEMORY

William J. Bartik, Jenkintown, Pa., assignor to Sperry Rand Corporation, New York, N.Y., a corporation of Delaware Filed July 28, 1964, Ser. No. 385,568
Int. Cl. G11b 5/00
U.S. Cl. 340—174 22 Claims

ABSTRACT OF THE DISCLOSURE

A bistable frequency memory system using thin film elements in which binary information is represented by the frequency of oscillation of the circuit.

Figure 1A:
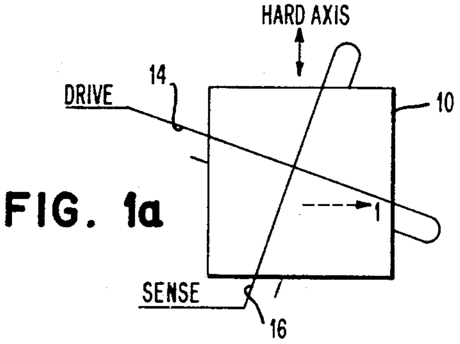

This invention relates to magnetic memories, and, in particular, to a magnetic memory which utilizes frequency logic.

Magnetic memories comprise, in general, a plurality of elements each of which is adapted to store a binary significance. Each of the binary elements, upon detection, provides a signal of one type for one binary quantity (such as a "one") and a signal of another type for the other binary quantity (such as a "zero"). The signals for representing a one and a zero may be, for example: a positive pulse and an absence of a pulse; a positive pulse and a negative pulse; or one frequency and a second frequency. This invention relates to a memory system which utilizes elements for reading out a signal at one frequency in order to represent one binary significance (such as a "one"), and a signal at a second frequency to represent the other binary significance (such as a "zero").

The utilization of different frequencies for representing different binary significances can be conveniently termed "frequency logic." Suitable detectors can be provided for detecting the presence or absence of one or the other frequency for detecting ones and zeros.

It has been found that memories utilizing thin anisotropic magnetic films, deposited either on planar substrates or on wires, can be conveniently operated with different frequencies for representing different binary significances. Magnetic memories made of thin anisotropic magnetic films are relatively inexpensive and easy to fabricate. Furthermore, such magnetic memories are more reliable than many other memories of the prior art; and, in addition, are extremely suitable for microminiaturization.

Therefore, it is a purpose of this invention to provide a novel, bistable oscillator to oscillate at either one of two different frequencies.

An object of this invention is to provide a novel bistable oscillator which can be set in two different states, one state providing an oscillation of one frequency, and the other state providing an oscillation at twice the frequency.

Another object of this invention is to provide a novel magnetic memory utilizing a plurality of thin anisotropic film elements wherein the magnetic memory is frequency-sensitive.

Another object of this invention is to provide a novel magnetic memory utilizing cylindrical magnetic wire having a skewed or helical easy axis of magnetization.

Still another object of this invention is to provide a novel memory wherein, selectively, a "one" is represented by one frequency and a "zero" by a different frequency, and vice versa.

Yet another object of this invention is to provide a novel magnetic memory utilizing magnetic elements having non-symmetrical characteristics.

Another object of this invention is to provide a novel magnetic memory matrix utilizing one of a first set of drive wires for producing a constant magnetic field, and one of a second set of drive wires for producing an alternating magnetic field for producing read-out signals, including one frequency or a different frequency, from the magnetic memory indicative of a one or a zero.

Yet another object of this invention is to provide novel comparison circuit for reading out the signals of a word from a memory which compares with the signals of such word applied to the memory.

In accordance with one embodiment of this invention, a plurality of thin anisotropic magnetic film elements are utilized for a magnetic memory. Each thin magnetic film element has an easy axis of anisotropy. One direction of magnetization along the easy axis is selected, arbitrarily, to represent a one, the opposite direction along the easy axis represents a zero. Drive lines for carrying a "read" instruction are coupled at right angles to sense lines, the sense lines being adapted to vary the information sensed (or read) from a film element. The drive and sense lines are coupled at an angle with respect to the easy axis. A D.C. bias is applied to the drive line, of sufficient magnitude, to cause the vectorial direction of the quiescent state of magnetization for one of the binary quantities to be aligned with the drive line; the vector for the other binary quantity assumes a quiescent position at an angle with respect to the drive line.

By superimposing, onto the D.C. bias, an alternating current at a frequency $f$ upon the drive line, the vectors for a one and a zero rotate to and fro about its respective quiescent positions, whereby output currents at a frequency $f$ representing a first binary state, and at a frequency $2f$ representing a second binary state, are presented onto the sense lines. By applying a D.C. bias at the opposite polarity, the output currents of the frequency $2f$ represents the first state, and at the frequency $f$ represents the second state.

In another embodiment of the invention, it is desired to read out from the memory, of the type described, the location of a particular word. The desired word is applied to the drive (bit) lines, wherein a bias of a first polarity together with the alternating current at the frequency $f$ represents a one on a bit line, and a bias of the second polarity together with an alternating current at frequency $f$ represents a zero on a bit line. The sense (word) line carrying the matching word produces an output signal at the frequency $2f$ with an absence of a signal at the frequency $f$. Other lines carry a combined signal at the frequencies $f$ and $2f$. The complement of the signal applied to the drive lines causes an output signal primarily at the frequency $f$ with a negligible signal at the frequency $2f$ (second harmonics caused by distortion) to be produced onto the matching word line.

In accordance with still another embodiment of this invention, a matrix arrangement is provided which utilizes individually selective A.C. drive wires and individually selective D.C. drive wires. The readout signal on a sense line, at a frequency $2f$ in the absence of the frequency $f$, indicates that the binary storage element receiving the simultaneous application of an alternating current together with a D.C. bias of one polarity designates one binary state.

Figures 5A, 5B:
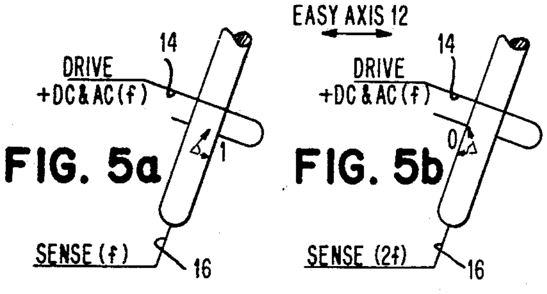
Figure 6:
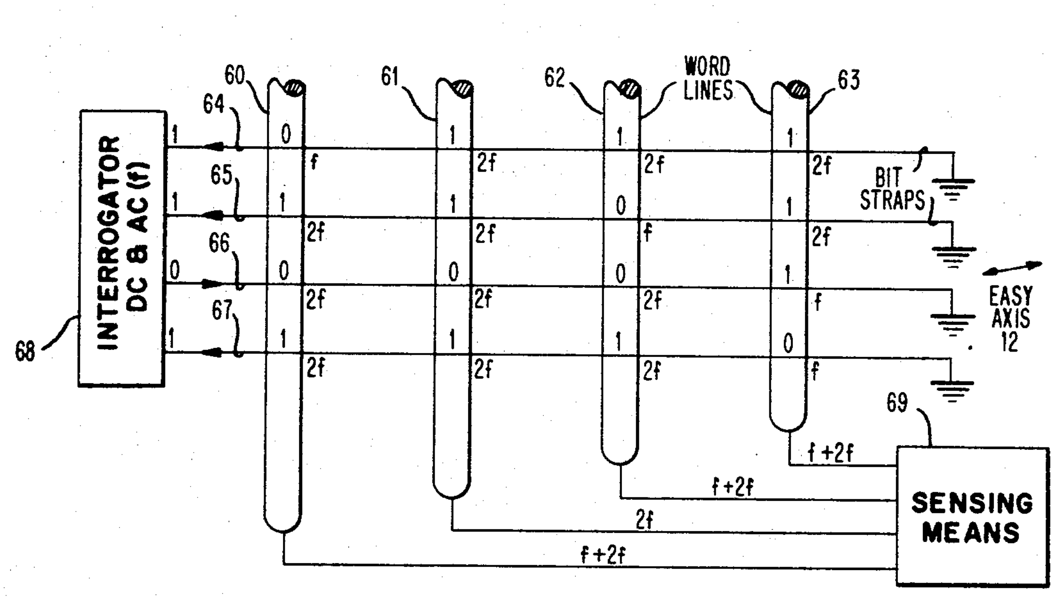
Figures 7A, 7B:
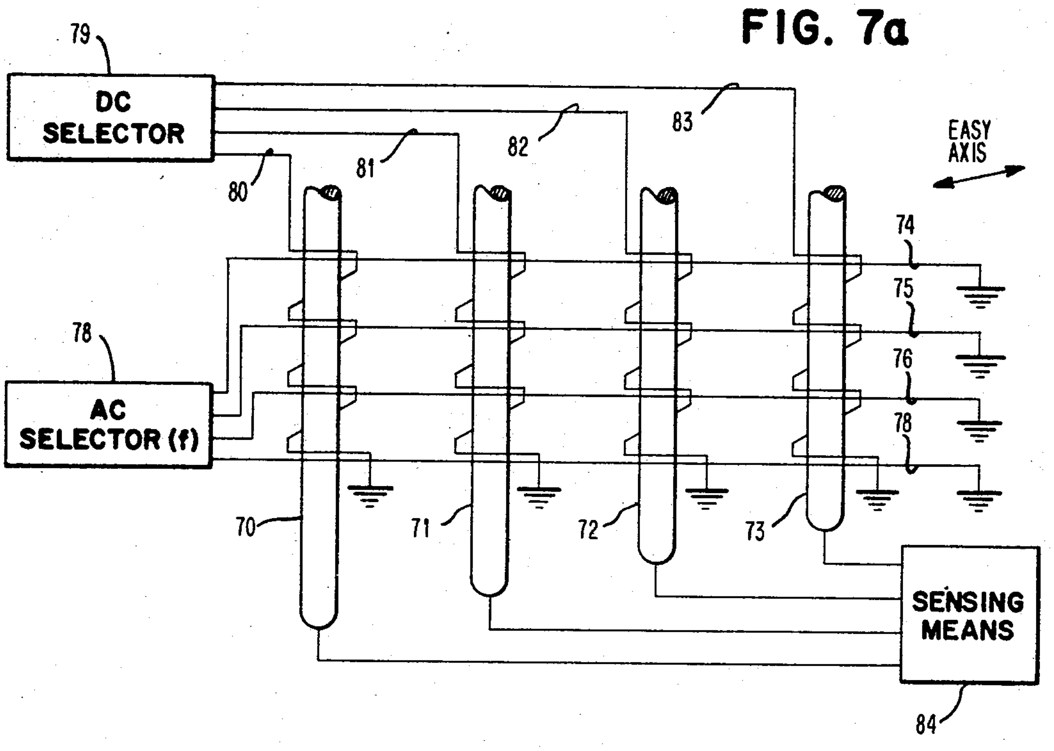

Other objects and advantages of this invention, together with its construction and method of operation, will become more apparent from the following description when read in conjunction with the accompanying drawing in which:

FIGS. 1*a*, 2*a*, 3*a*, and 4*a* illustrate schematically one embodiment of this invention, and represent the vector for a "one" at various stages dependent upon voltage inputs;

FIGS. 1*b*, 2*b*, 3*b*, and 4*b* illustrate the embodiment of FIGS. 1*a*, 2*a*, 3*a*, and 4*a*, and represents the vector for a "zero";

FIGS. 5*a* and 5*b* illustrate schematically another embodiment of this invention utilizing plated wire coated with a film of magnetic alloy, the easy axis of magnetization being helical or skewed with respect to the cylindrical axis of the wire;

FIG. 6 is a schematic of one embodiment of this invention illustrating a memory wherein it is desired to read out the location for a given word;

FIG. 7*a* is a view illustrating a matrix arrangement of a device which practices the truth table illustrated in FIG. 7*b*; and FIG. 7*b* is a truth table describing the respective output signals presented upon the sense lines for various driving currents applied to the matrix for different states of binary significance.

Figure 1B:
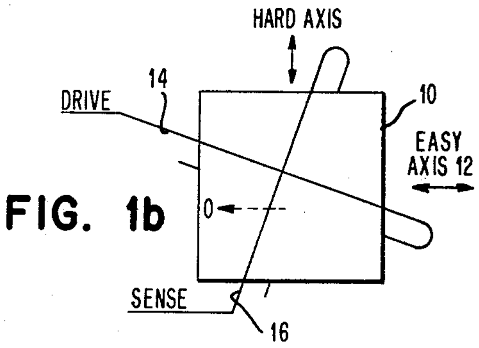
Figure 2A:
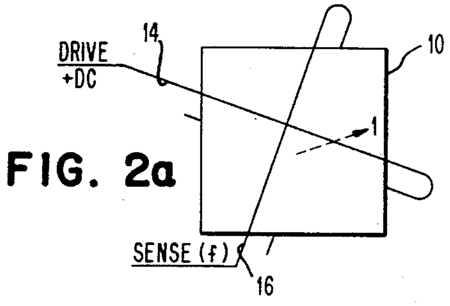
Figure 2B:
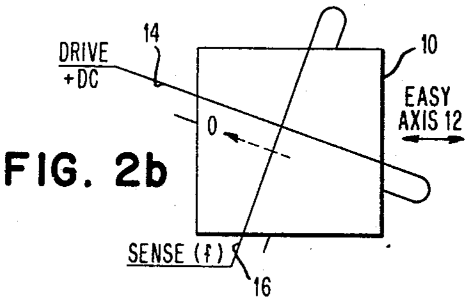

Referring to FIGS. 1*a* and 1*b*, there is shown a thin planar magnetic film 10 having an easy axis 12 of anisotropy, the direction of magnetization for a one during its quiescent state being arbitrarily selected to be towards the right as illustrated in FIG. 1*a*. As shown in FIG. 1*b*, the opposite direction (towards the left) represents a zero. The easy axis 12 of magnetization is illustrated horizontally as shown in FIGS. 1*a* and 1*b*. A drive wire 14 and sense line 16 are coupled to the magnetic film 10 at right angles to each other. The drive line 14 is coupled to the easy axis 12 at an acute angle thereto. A positive D.C. bias source is applied to the drive line 14. The application of the bias source upon the line 14 creates a magnetic field having a component perpendicular to the drive line in an upwardly direction. This field causes the magnetic vector for a one to rotate from the horizontal right direction shown in FIG. 1*a* to the inclined rightwardly direction shown in FIG. 2*a*. The bias source is of sufficient magnitude to cause the vector for a zero to rotate from the leftward horizontal direction (FIG. 1*b*) to alignment with the drive line 145, as shown in FIG. 2*b*.

Figure 3A:
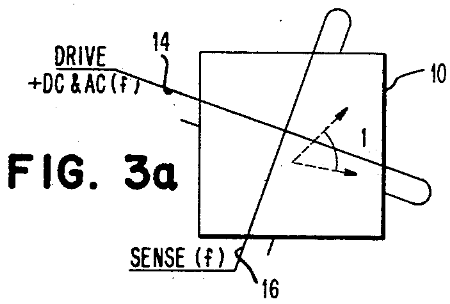
Figure 3B:
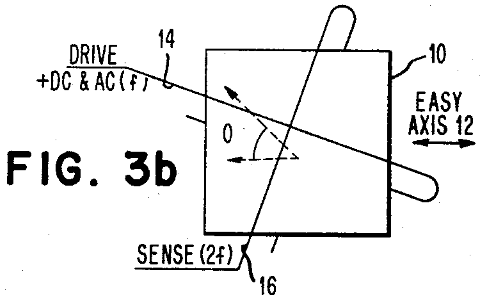

Referring now to FIGS. 3*a* and 3*b*, there is illustrated the conditions existing when an alternating current at a frequency *f* is superimposed upon the D.C. bias applied to the drive line 14. The magnitude of the alternating current at the frequency *f* is sufficient so that the vector for a one (illustrated in FIG. 3*a*) rotates to and fro between limits of an angle entirely on one side of the drive line. As illustrated in FIG. 3*b*, the vector for a zero rotates to and fro substantially equally to each side of the drive line.

As the vector for a one rotates to and fro angularwise along one side only of the drive line (FIG. 3*a*), the output signal produced onto the sense line is at the same frequency as the alternating current applied to the drive line. However, the vector for a zero (FIG. 3*b*) rotates to and fro about the drive line, rotating along each side thereof, whereby an output signal is produced upon the sense line 16 at the frequency 2*f*.

Figure 4A:
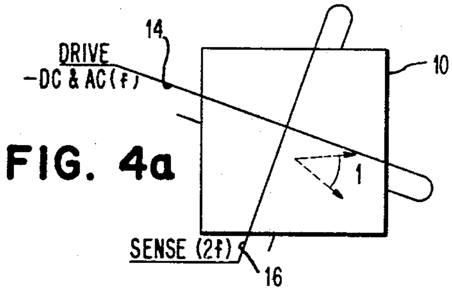
Figure 4B:
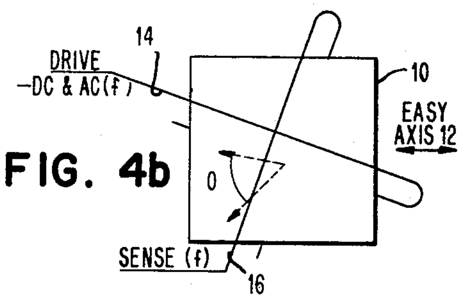

FIGS. 4*a* and 4*b* illustrate that, upon application of a negative D.C. potential together with an alternating current at a frequency *f* to the drive line 14, the sense line 16 of FIGS. 4*a* and 4*b* produces output signals at 2*f* and *f*, respectively, for a one and zero, thus reversing the significance of the device illustrated in FIGS. 3*a* and 3*b*.

FIGS. 5*a* and 5*b* are similar to FIGS. 3*a* and 3*b*, except that the sense wire 16 has a cylindrically plated thin magnetic film 10 deposited thereon. The easy axis of magnetization of the film is skewed (helical) with respect to the central axis of the wire. The relative operation of the cliindrical film (of FIGS 5*a* and 5*b*) is similar to that described with regard to the planar film of FIGS. 3*a* and 3*b*.

Referring to FIG. 6, there is illustrated a memory matrix wherein each of the plated sense wires 60, 61, 62, 63 represent different word lines. Various bit straps 64, 65, 66, 67 are coupled across each of the word lines 60–63, inclusive. A suitable interrogator 68 which provides a voltage source of D.C. and A.C. (at frequency *f*) potentials supplies the necessary signals to the bit straps 64–67. The output signals produced upon the sense lines 60–63 are detected by a suitable sensing means 69.

Each of the various elements of a word line is magnetized towards the right to represent a one (by way of example) or towards the left to represent a zero, as illustrated in FIGS. 5*a* and 5*b*. By applying a negative D.C. signal, together with a superimposed A.C. signal at a frequency *f* at a fixed reference phase, to the uppermost, upper middle, and lowermost bit lines 64, 65, and 67 (FIG. 6), the uppermost magnetic element for the word line 60, which stores a zero, produces an output signal at the frequency *f*; each of the upper middle and lowermost magnetic elements for the word line 60, which each stores a one, produces an output signal at the frequency 2*f*. The application of a positive D.C. signal and superimposed A.C. signal at the frequency *f* at the fixed phase to the lower middle bit line 66 causes the lower middle element for the word line 60, which stores a zero, to produce an output signal at the frequency **2*f*. The sum output of the word line 60** contains components at frequencies *f* and 2*f*.

Each of the word lines 60–63 contains four bit words. For example, the word line 60 contains a word 0101. The bit line 61 contains a word 1101. The bit line 62 contains a word 1001, and the bit line 63 contains a word 1110. To inquire which word line contains a specific word, for example, 1101, the interrogator 68 provides alternating current signals at a frequency *f* upon the lines 64, 65, 66 and 67, together with a negative D.C. bias (to represent a "one") on lines 64, 65, and 67, and a positive D.C. bias (for a "zero") on line 66, to inquire which word line contains the word 1101. When a bit element agrees with the inquiry, a signal at the frequency 2*f* is produced. When there is a disagreement, a signal at the frequency *f* occurs. For example, referring to line 60, the upper bit position, at 0, when queried with the 1, produces an output signal at a frequency *f*. The agreement of a 101, with the signals applied on lines 65, 66, and 67, produces signals at the frequency 2*f*. The output upon the word or sense line 60 is a combination of signals at the frequency *f* and the frequency 2*f*. In similar manner, the word lines 62 and 63 also produce output signals carrying components at the frequency *f* and the frequency 2*f*. The word line 61 contains complete agreement with the inquiry, and therefore produces an output signal at the frequency 2*f*, with the complete absence of a signal at the frequency *f*.

As illustrated in the preferred embodiment, the inquiry of a word 1101 is achieved by applying signals indicative of that word, thereby a signal for a 1 and a 0 is applied, respectively, using negative and positive biases, together with the superimposed A.C. signal at the frequency *f*. Upon a complete agreement with the word line, an output signal is achieved at the frequency 2*f* with a complete absence of a signal at the frequency *f*. When there is disagreement, signals are produced at both frequency *f* and 2*f*.

The application of complement signals (i.e. disagreement with each bit of a word) produces, generally, an output signal at the frequency *f*; such application may produce erroneous results where a non-linear film is present. In such a case, during a comparison, a sense signal at the frequency $f$ is produced which may contain a second harmonic at frequency $2f$ due to non-linearities.

FIG. 7a is a schematic representation of a plurality of cylindrical wires plated with a thin anisotropic magnetic film having its easy axis of magnetization skewed with respect to its circumferential axis. For simplicity of illustration, there are shown four word lines 70, 71, 72, 73, each being coated with a thin anisotropic magnetic film. Across the wires 70, 71, 72, 73, defining various bit positions, are A.C. selector wires 74, 75, 76, 77 which are juxtaposed at right angles with respect to the central axis of the wires 70, 71, 72, 73, respectively. The A.C. selector wires 74, 75, 76, 77 are coupled to an A.C. selector circuit 78 which selectively provides an alternating current signal at the frequency $f$. A D.C. selector 79 selectively provides a direct current bias to drive lines 80, 81, 82, 83, each of which is separately coupled to its respective wire 70, 71, 72, 73, one drive wire 80 being coupled to each bit position of one plated wire 70. By the selected energization of one of the A.C. selector wires 74, 75, 76, 77, and one of the D.C. selector wires 80, 81, 82, 83, one (and one only) of the elemental areas of one of the plated wires 70, 71, 72, 73 is interrogated by an adjacent pair of windings from the D.C. selector 79 and the A.C. selector 78. For example, by the simultaneous application of the D.C. selector wire 80, together with the A.C. selector wire 74, only the upper bit position for the wire 70 is selected. The other bit positions for the wire 70 have only a D.C. bias applied thereto with the complete absence of any A.C. potential; the upper bit positions for the wires 71, 72, 73 have only an A.C. field applied thereto with the absence of any D.C. field. The other bit positions remaining in the matrix have no field applied thereto. Each of the word lines 70, 71, 72, 73 is coupled to a suitable sensing means 84.

The truth table, illustrated in FIG. 7b, describes the various conditions for the matrix illustrated in FIG. 7a. The simultaneous application of a positive D.C. field together with an A.C. field, when a "zero" is stored in the elemental area, produces an output signal at the frequency $2f$ with complete absence of a signal at the frequency $f$ onto the selected word line. When a "one" is stored, or when the A.C. field alone is applied, an output signal is produced having a combination of signals at the frequency $f$ and frequency $2f$. In order to detect when a "one" is present, a negative D.C. field together with an A.C. field is simultaneously applied producing an output signal for a "one" at the frequency $2f$ only, with an absence of a signal at the frequency $f$.

Thus, there has been described a thin film memory wherein the sensed signals are of different frequency, thereby providing a distinction between a one and a zero. Also, there has been described an associative memory element in which only one element is used per bit.

Also described above were means for reading out of the memory, in general. Writing into a memory, utilizing skew in the fashion described, can be performed in the usual manner applicable to non-skewed films. Bit current, during a writing operation, is increased slightly in order to compensate for the skew. Excessive bit current is undesirable and may disturb an adjacent bit through "creeping," thus limiting the amount of skew that is permitted in a cylindrical film system. In a planar film system, the current carrying conductors and the magnetic material need not be interconnected as in the manner of a plated cylindrical film system, whereby the constraint on the current can be relaxed. A second overlay of drive wires for writing can coincide with the magnetic axis of the film, although the first overlay of drive wires for reading does not coincide.

Various modifications can be performed, such as by striating the word lines in order to avoid eddy currents and to allow flux penetration. Furthermore, additional selector windings can be added for selecting a particular bit position, thus giving rise to a 3 or higher order dimensional coincidence.

It is desired that this invention be construed broadly and that it be limited solely by the scope of the claims.

The embodiments of the invention in which an exclusive property or privilege is claimed are defined as follows:

1. In combination,
- a bistable oscillator comprising a thin film memory element having the property of uniaxial anisotropy adapted to selectively oscillate at a first frequency or a second frequency depending upon whether a binary one or zero is stored in said memory element,
- means for coupling an excitation source to said oscillator, and
- sensing means coupled to said oscillator.

2. In combination,
- a bistable oscillator adapted to be selectively set in a first state or a second state,
- means for coupling an excitation source containing an alternating frequency $f$ to said oscillator, and
- sensing means coupled to said oscillator and adapted to provide a first output signal containing an alternating current frequency $f$ when said oscillation is set in said first state and a second output signal containing an alternating current frequency $2f$ when said oscillator is set in said second state.

3. The combination as claimed in claim 2 wherein said first output signal and said second output signal are dissimilar.

4. In combination,
- a magnetic element adapted to be selectively magnetized in a first direction and a second direction, said first direction and said second direction forming an obtuse angle less than a straight angle;
- means for coupling an excitation source to said element, said source having a frequency $f$; and
- sensing means coupled to said element,
- said sensing means providing a signal having a frequency $f$ when said element is magnetized in said first direction and said source is coupled to said element, and providing a signal having a frequency $2f$ when said element is magnetized in said second direction.

5. In combination,
- a magnetic element adapted to be selectively magnetized in one direction or the opposite direction, both directions forming a straight angle;
- means for coupling a bias source to said element, whereby due to said bias source, the selective directions of magnetization are re-aligned to a first direction or a second direction, respectively, said first direction and second direction forming an obtuse angle less than a straight angle;
- means for coupling an excitation source to said element, said source having a frequency $f$; and
- sensing means coupled to said element,
- said sensing means providing a signal having a frequency $f$ when said element is magnetized in said first direction and said sources are coupled to said element and providing a signal having a frequency $2f$ when said element is magnetized in said second direction and said sources are coupled to said element.

6. The combination as claimed in claim 5 wherein said signals are dissimilar.

7. In combination,
- a magnetic device, having symmetrical magnetic characteristics, which is adapted to be selectively magnetized in one direction or the opposite direction, for representing a first binary quantity or a secondary binary quantity, respectively;
- means for introducing non-symmetrical characteristics to said device whereby said one direction and said opposite direction are re-aligned to a first direction and a second direction, respectively;

driving means for reading out the binary quantity stored in said device, said driving means including an alternating current source having a frequency $f$; and sensing means coupled to said device for providing, when reading out, an output signal at said frequency $f$ when said device selectively represents said first binary quantity, and an output signal at a frequency $2f$ when said device selectively represents said second binary quantity.

8. In combination, a thin anisotropic magnetic film which is adapted to be selectively magnetized in one direction along its easy axis of magnetization or in the opposite direction, for representing a first binary quantity or a second binary quantity, respectively;

means for introducing non-symmetrical characteristics to said film whereby said one direction and said opposite direction are re-aligned to a first direction and a second direction, respectively;

driving means for reading out the binary quantity stored in said film said driving means including an alternating current source having a frequency $f$; and sensing means coupled to said film for providing, when reading out, an output signal at said frequency $f$ when said film selectively represents said first binary quantity, and an output signal having a frequency $2f$ when said film selectively represents said second binary quantity.

9. In combination, a thin anisotropic magnetic film which is adapted to be selectively magnetized in one direction along its easy axis of magnetization or in the opposite direction, for representing a first binary quantity or a second binary quantity, respectively;

means for producing a magnetic field along a fixed direction in the plane of said film to form an obtuse angle with said one direction, the directions of magnetization for the first and second binary quantities being re-aligned to a first direction and a second direction, respectively, said first direction and said second direction forming an angle less than a straight angle, said magnetic field being of such magnitude to cause said first direction to form a right angle with said fixed direction;

means for superimposing an alternating magnetic field along said fixed direction having a frequency $f$; and sensing means coupled to said film for providing a signal having a frequency $f$ when said film represents one binary quantity and for providing a signal having a frequency $2f$ when said film represents the other binary quantity.

10. In combination, a thin anisotropic magnetic film including an element adapted to be selectively magnetized in one direction along its easy axis of magnetization for representing a first binary quantity or in the opposite direction for representing a second binary quantity;

means for producing a constant magnetic field along a certain axis in a fixed direction lying along said film element, said fixed direction forming an obtuse angle with said one direction, the directions of magnetization, due to said magnetic field, for said first and said second binary quantities being re-aligned to a first direction and a second direction, respectively, said first direction and said second direction forming an angle less than a straight angle, said magnetic field being of such magnitude to cause said first direction to form a right angle with said fixed direction;

means for producing an alternating magnetic field along said certain axis having a frequency $f$; and sensing means coupled to said film element for providing various output signals.

11. The combination as claimed in claim 10 wherein said constant magnetic field is reversible.

12. The combination as claimed in claim 10 wherein the simultaneous application of said constant field and said alternating field, when said film element represents one binary quantity only, causes said sensing means to provide an output signal at a frequency $2f$ with an absence of said frequency $f$.

13. The combination as claimed in claim 12 wherein said constant magnetic field is reversible.

14. The combination as claimed in claim 10 wherein said means for producing a constant magnetic field and said means for producing an alternating current field are selectively operable.

15. The combination as claimed in claim 14 wherein the simultaneous application of said constant field and said alternating field, when said film element represents one binary quantity only, causes said sensing means to provide an output signal at a frequency $2f$ with an absence of said frequency $f$.

16. The combination as claimed in claim 14 wherein said constant magnetic field is reversible.

17. The combination as claimed in claim 16 wherein said sensing means provides an output signal at a frequency $2f$ with an absence of said frequency $f$ only upon the coincident application of said constant field and said alternating field, said last named output signal representing one binary quantity when said constant field is produced in said fixed direction and representing the other binary quantity when said constant field is reversed.

18. The invention as claimed in claim 10 wherein said film is coated upon a planar substrate.

19. The invention as claimed in claim 10 wherein said film is coated upon a cylindrical wire.

20. The invention as claimed in claim 19 wherein the easy axis of said film is skewed with respect to the circumferential axis of said wire.

21. In combination, a first line, a second line, a third line, a fourth line, each of said lines substantially parallel to each other;

a first wire, a second wire, a third wire, and a fourth wire, each of said wires substantially parallel to each other, said wires being juxtaposed at right angles to said lines forming a cross-over per wire at each said line;

a plurality of thin anisotropic magnetic film elements, one of said elements being located at each said cross-over, said film elements having its easy axis of magnetization aligned to form acute angles with its associated line, each of said film elements adapted to be selectively magnetized in one direction along its easy axis for representing one binary quantity or in the opposite direction along the easy axis for representing the other binary quantity;

means for selectively applying a D.C. bias level of one polarity for representing one binary quantity and of the opposite polarity for representing the other binary quantity to each of said lines, the magnitude of said bias level of one polarity being of such value to rotate the magnetic vector for a first binary quantity said acute angle from its easy axis to alignment with its associated line, the magnitude of said bias level of the opposite polarity being of such value to rotate the magnetic vector for the second binary quantity said acute angle from its easy axis to alignment with its associated line;

means for applying an alternating current at a frequency $f$ to said lines; and means for sensing the presence and absence of said frequency $f$ and frequency $2f$ for each said wire.

22. The combination as claimed in claim 21, wherein each of said wires is coated with a thin anisotropic magnetic film, the easy axis of said films being skewed with respect to the circumferential axis of said wires.

References Cited

UNITED STATES PATENTS 2,521,789 9/1950 Grosdoff ------------ 331—34
3,125,745 3/1964 Oakland.

3,296,453 1/1967 Ghisler.

TERRELL W. FEARS, Primary Examiner

U.S. Cl. X.R.

331—36